United States Patent
Yamazaki

(10) Patent No.: US 11,615,119 B2
(45) Date of Patent: Mar. 28, 2023

(54) METHODS, SYSTEMS, AND NON-TRANSITORY COMPUTER READABLE MEDIUM FOR GROUPING SAME PERSONS

(71) Applicant: NEC Corporation, Tokyo (JP)

(72) Inventor: Satoshi Yamazaki, Singapore (SG)

(73) Assignee: NEC CORPORATION, Tokyo (JP)

(*) Notice: Subject to any disclaimer, the term of this patent is extended or adjusted under 35 U.S.C. 154(b) by 73 days.

(21) Appl. No.: 17/270,543

(22) PCT Filed: Aug. 20, 2019

(86) PCT No.: PCT/JP2019/032374
§ 371 (c)(1),
(2) Date: Feb. 23, 2021

(87) PCT Pub. No.: WO2020/045157
PCT Pub. Date: Mar. 5, 2020

(65) Prior Publication Data
US 2021/0200789 A1    Jul. 1, 2021

(30) Foreign Application Priority Data
Aug. 31, 2018  (SG) .......................... 10201807508Y

(51) Int. Cl.
*G06F 16/28* (2019.01)
*G06F 16/23* (2019.01)
*G06F 16/24* (2019.01)

(52) U.S. Cl.
CPC ........ *G06F 16/285* (2019.01); *G06F 16/2379* (2019.01); *G06F 16/24* (2019.01); *G06F 16/28* (2019.01)

(58) Field of Classification Search
CPC ........ G06F 16/285; G06F 16/28; G06F 16/24; G06F 16/2379
See application file for complete search history.

(56) References Cited

U.S. PATENT DOCUMENTS

| | | | |
|---|---|---|---|
| 7,386,151 B1* | 6/2008 | Moritz | G07C 9/37 382/116 |
| 10,911,477 B1* | 2/2021 | Kharraz | G06F 16/90344 |
| 2006/0251338 A1* | 11/2006 | Gokturk | G06F 16/583 707/E17.022 |
| 2009/0106846 A1* | 4/2009 | Dupray | G06Q 40/02 726/26 |
| 2010/0131835 A1* | 5/2010 | Kumar | G06Q 30/0269 715/205 |

(Continued)

OTHER PUBLICATIONS

International Search Report for PCT Application No. PCT/JP2019/032374, dated Nov. 5, 2019.

(Continued)

*Primary Examiner* — Huawen A Peng
(74) *Attorney, Agent, or Firm* — Sughrue Mion, PLLC

(57) ABSTRACT

A method and system (102) for grouping same persons are provided. The system (102) includes: a database (104) for storing person specific data of a plurality of reference persons in a hierarchical structure; an input module (206) for receiving person specific data of a target person; and a similarity search module (212) for searching the database (104) for data similar to the person specific data of the target person.

12 Claims, 12 Drawing Sheets

(56) References Cited

U.S. PATENT DOCUMENTS

| | | | |
|---|---|---|---|
| 2011/0087677 A1* | 4/2011 | Yoshio | H04N 5/76 |
| | | | 707/E17.059 |
| 2011/0222782 A1 | 9/2011 | Kashiwagi | |
| 2011/0228984 A1* | 9/2011 | Papke | G06V 20/52 |
| | | | 382/103 |
| 2015/0296187 A1* | 10/2015 | Baldwin | G06F 3/0484 |
| | | | 348/143 |
| 2016/0012280 A1 | 1/2016 | Ito et al. | |
| 2017/0178345 A1* | 6/2017 | Pham | G06V 10/758 |
| 2017/0337791 A1* | 11/2017 | Gordon-Carroll | |
| | | | G08B 13/19682 |
| 2018/0000359 A1* | 1/2018 | Watanabe | A61B 5/0261 |
| 2018/0300557 A1* | 10/2018 | Rodenas | G08B 13/19613 |
| 2019/0108404 A1* | 4/2019 | Xu | G06V 30/242 |
| 2019/0197887 A1* | 6/2019 | Modi | H04B 10/548 |

OTHER PUBLICATIONS

English translation of Written opinion for PCT Application No. PCT/JP2019/032374, dated Nov. 5, 2019.

Liu et al., "Efficient similarity search using tree-structured index based on hierarchical relationship of similarity", The 5th Forum on Data Engineering and Information Management, DEIM Forum 2013 A9-1, pp. 1-8.

* cited by examiner

METHODS, SYSTEMS, AND NON-TRANSITORY COMPUTER READABLE MEDIUM FOR GROUPING SAME PERSONS

This application is a National Stage Entry of PCT/JP2019/032374 filed on Aug. 20, 2019, which claims priority from Singapore Patent Application 10201807508Y filed on Aug. 31, 2018, the contents of all of which are incorporated herein by reference, in their entirety.

TECHNICAL FIELD

The present invention generally relates to methods and devices for grouping same persons, and more particularly relates to methods and systems for determining from large amounts of surveillance data whether a person is repeatedly monitored in the surveillance data.

BACKGROUND ART

While recent developments in surveillance equipment like cameras or microphones has made it possible to collect data that may be relevant to security issues, it is impossible to manually evaluate the large amount of data collected. Automated systems and methods are required, but the large amount of data may make processing inefficient in commonly used systems and methods. In an exemplary application of surveillance data, it shall be determined whether any suspicious person is included in the surveillance data, and all the surveillance data is to be included in a database.

Thus, what is needed are suspicious person tracking technologies based on video and/or acoustic analytics for improvement of security in public areas, including a real-time person database updating to realize on-demand suspicious person search systems and methods.

Furthermore, other desirable features and characteristics will become apparent from the subsequent detailed description and the appended claims, taken in conjunction with the accompanying drawings and this background of the disclosure.

SUMMARY OF INVENTION

Solution to Problem

According to at least one embodiment of the present invention, a system for grouping same persons is provided. The system includes: a database for storing person specific data of a plurality of reference persons in a hierarchical structure; an input module for receiving person specific data of a target person; and a similarity search module for searching the database for data similar to the person specific data of the target person.

According to another embodiment of the present invention, a method for grouping same persons is provided. The method includes: storing in a database person specific data of a plurality of reference persons in a hierarchical structure; receiving person specific data of a target person; and searching the database for data similar to the person specific data of the target person.

According to another embodiment of the present invention, a non-transitory computer readable medium is provided. The non-transitory computer readable medium includes program instructions for causing a computer to perform a method for grouping same persons including: storing person specific data of a plurality of reference persons in a hierarchical structure; receiving person specific data of a target person; and searching the database for data similar to the person specific data of the target person.

BRIEF DESCRIPTION OF DRAWINGS

The accompanying figures, where like reference numerals refer to identical or functionally similar elements throughout the separate views and which together with the detailed description below are incorporated in and form part of the specification, serve to illustrate various embodiments and to explain various principles and advantages in accordance with a present embodiment.

Skilled artisans will appreciate that elements in the figures are illustrated for simplicity and clarity and have not necessarily been depicted to scale.

DESCRIPTION OF EMBODIMENTS

The following detailed description is merely exemplary in nature and is not intended to limit the invention or the application and uses of the invention. Furthermore, there is no intention to be bound by any theory presented in the preceding background of the invention or the following detailed description. It is the intent of the present embodiment to present a method and a system for grouping same persons.

Figure 1:
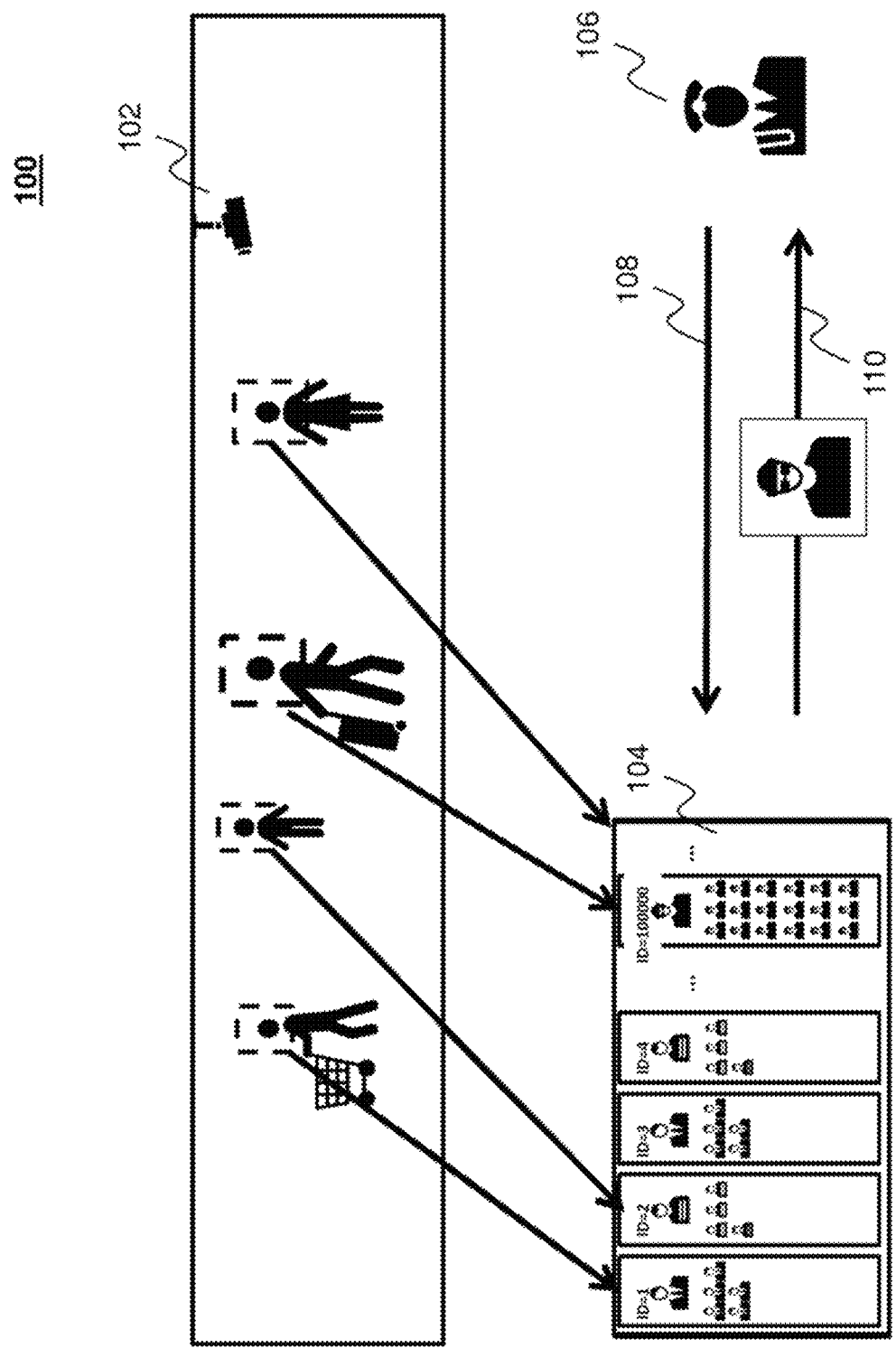
FIG. 1 depicts an illustration of a use case according to various embodiments.

FIG. 1 shows an illustration 100 of a use case according to various embodiments, for example an on-demand suspicious person search system. A surveillance system 102 may capture information of people in a vicinity of the surveillance system 102. The information may be person specific data, and may, for example include visual data (for example image data, for example still image data or moving image data), for example, captured by a camera, or acoustic data, for example captured by a microphone. For example, the person specific data may include information related to a feature of a face of the respective person, information related to a shape of head of the respective person, information related to a position of the eyes of the respective person, information related to a position of the nose of the respective person, information related to a position of the mouth of the respective person, audio data, voice data, information related to a body shape of the respective person, or information on cloths that the respective person is wearing.

The person specific data may be stored in a data base 104, like will be described in more detail below. The database may be updated online, i.e. for every new piece of information that is captured by the surveillance system 102, the database 104 is updated.

An authorized entity 106 (for example a security related government agency, or an owner of a facility under surveillance, or any other entity that may have an interest to enhance security and that is empowered by legal provisions or that may carry out the surveillance without infringing any legal provisions) may send an on-demand request 108 to the database 104. The database 104 may be used by a system for grouping same persons, like will be described in more detail below, to determine the requested information, and may send back information 110 about a suspicious person (for example about a loiterer who appears frequently in the person specific information stored in the database 104).

Figure 2:
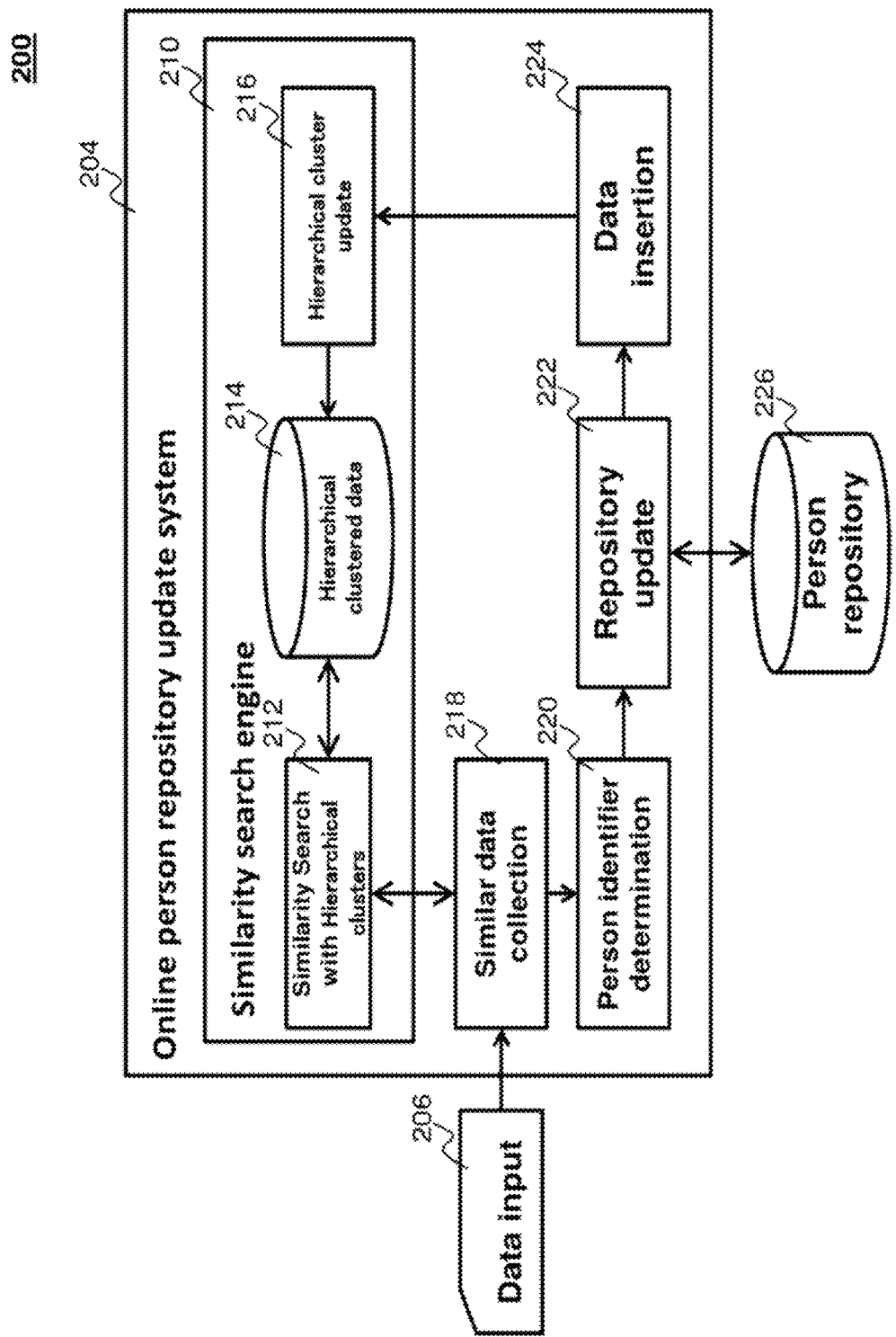
FIG. 2 depicts a system for grouping same persons in accordance with a present embodiment.

FIG. 2 shows a system 200 for grouping same persons in accordance with a present embodiment. The system 200 may include an online person repository update system 204, which may include a similarity search engine 210, a similar data collection module 218 (for example a similar face data collection module). The online person repository update system 204 may further include a person identifier (ID) determination module 220 (which may traverse the hierarchical structure of the database based on the received person specific data, for example to determine a person identifier corresponding to the input data). The person identifier determination module 220 may decide whether it assigns an existing person ID (which may then be an identifier of a cluster, i.e. a cluster ID) to the inputted data, or not. If the number of searched similar data is not higher than "threshold2", the module outputs an empty list to Repository update module ("no" in determination step 306 in FIG. 3). In the case of higher number of searched similar data, the module outputs a list of person IDs which the searched similar data has ("yes" in determination step 306 in FIG. 3).

The online person repository update system 204 may furthermore include a repository update module 222 (for updating a person repository 226, for example for updating the data related to occurrences of the plurality of persons at least one location based on the received person specific data). The repository update module 222 may update the person repository 226 with a list of personIDs for inputted data (which may correspond to steps 308, 310, 312, and 316 in FIG. 3). If the list has only one personID, the repository update module 222 assigns the personID to the inputted data and inserts the inputted data (in other words: the person information) into person repository 226 (which corresponds to "yes" in determination step 308 and to step 312 in FIG. 3). If the list has more than one personID, the repository update module 222 merges all person information related to (the assigned) personID (which corresponds to "no" in determination step 308 and to step 310 in FIG. 3). During the merging process, the online person repository update system 204 may that recognize the listed personIDs are for a same person although the system assigned different personIDs to data before the current inputted data is received for processing. In the case of an empty list, the repository update module 222 may create a new personID, assigns this ID to the inputted data, and inserts into person repository 226 (which may correspond to step 316 in FIG. 3).

The online person repository update system 204 may further include a data insertion module 224. The data insertion 224 may insert inputted data into the search engine's database (which may correspond to step 314 in FIG. 3). The similarity search engine 210 may include a similarity search module 212 (with hierarchical clusters), a hierarchical clustered database 214, and a hierarchical cluster update module 216. A data input module 206 may provide input data (for example person specific data) to the similar data collection module 218.

According to various embodiments, similarity scores between various persons may be determined. A similarity score may be determined for each type of feature. A similarity score may be determined for the same type of feature, but not for different types of feature. Each input data (for example person data) may have at least one of features such as face, voice, etc. The (overall) similarity score may be calculated based on various types of features, for example by summation of (feature specific) similarity scores. For example, if a person information does not have voice feature which other person information have, it may be desired to skip the similarity score calculation for voice feature.

For example, for Person A, the following features may have been determined: Face feature "a" and voice feature "1". For Person B, the following features may have been determined: face feature "b" and voice feature "2". Then the similarity scores between person A and B may be determined as follows:

$$\text{SimilarityScore}(A,B) = \text{faceSimilarity}(a,b) + \text{voiceSimilarity}(1,2).$$

For Person C, a voice feature may not be available, and the face feature "c" may have been determined. Then the similarity scores between person A and C may be determined as follows:

$$\text{SimilarityScore}(A,C) = \text{faceSimilarity}(a,c).$$

For example, similarity (which may for example be face similarity or voice similarity) with features a and b (which may for example be face features or voice features, and which may be vectors of float, and may include characteristics of persons face (like position or shape or size or color of nose, eyes, ears) or voice (like frequency characteristics, loudness, accent) may be determined based on cosine similarity, for example:

$$\text{Similarity}(a,b) = a \cdot b / (|a||b|)$$

where $a \cdot b$ is the scalar product of vectors a and b, and $|a|$ and $|b|$ are the lengths of vectors a and b, respectively.

Table 1 shows an example of a person repository 208. The person repository may include a plurality of data sets, each data set comprising a person ID shown on a specific piece of recorded information (for example an image or a frame captured by a surveillance camera), a data ID (identifying the respective data set), a location (for example of the surveillance camera), and data information (for example time and day at which the data set has been recorded).

TABLE 1

| Person ID | Data ID | Location ID | Date |
|---|---|---|---|
| 1 | 1 | Camera 1 | 10:00:00 AM 28 Feb. 2018 |
| 1 | 3 | Camera 1 | 11:05:20 AM 28 Feb. 2018 |
| 1 | 4 | Camera 1 | 11:05:21 AM 28 Feb. 2018 |

TABLE 1-continued

| Person ID | Data ID | Location ID | Date |
|---|---|---|---|
| 1 | 8 | Camera 2 | 12:16:00 AM 28 Feb. 2018 |
| 2 | 2 | Camera 1 | 11:00:40 AM 28 Feb. 2018 |
| 2 | 5 | Camera 2 | 12:15:10 AM 28 Feb. 2018 |
| 2 | 6 | Camera 2 | 12:15:16 AM 28 Feb. 2018 |
| 2 | 7 | Camera 2 | 12:15:23 AM 28 Feb. 2018 |
| ... | ... | ... | ... |

Figure 3:
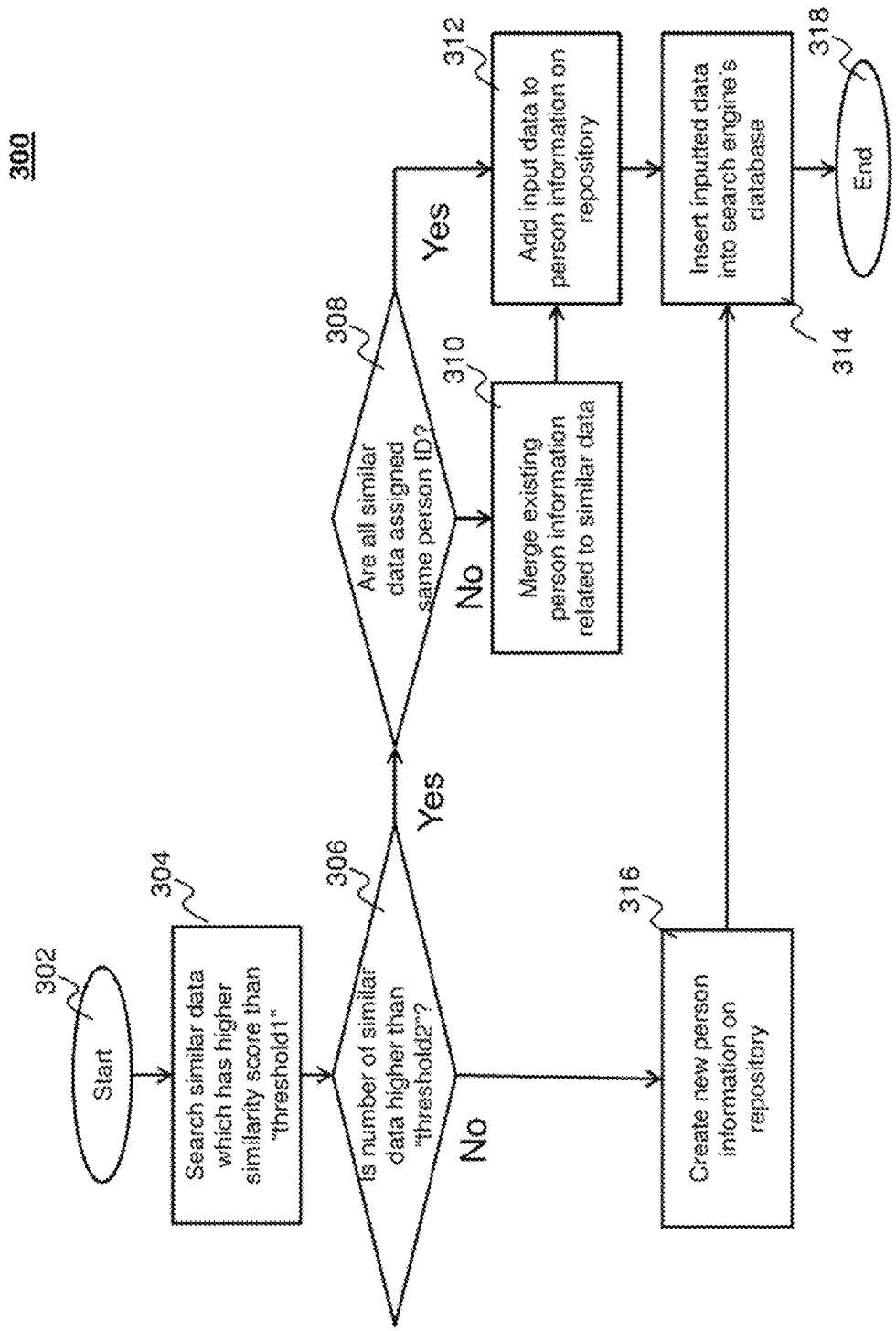
FIG. 3 depicts a flow diagram illustrating a method for online same person grouping with indexing in accordance with the present embodiment.

FIG. 3 shows a flow diagram 300 illustrating a method for online same person grouping with indexing in accordance with the present embodiment, for example using the system 200 of FIG. 2. Processing may start at step 302. At step 304, it may be searched for similar data which has a similarity score (regarding similarity to the input data) higher than a first threshold ("threshold1"). The first threshold may define a similarity score lower bound. At step 306, it may be determined whether the number of similar data is higher than a second threshold ("threshold2"). The second threshold may define a lower bound of number of similarity data. If it is determined at step 306 that the number of similar data is not higher than the second threshold, processing may proceed at step 316, where a new person information is created in the repository, and subsequently, at step 314, the input data is inserted into the search engine's database. If it is determined at step 306 that the number of similar data is higher than the second threshold, processing may proceed at step 308, where it may be determined whether all similar data are assigned the same person identifier. If it is determined at step 308 that all similar data are assigned the same person identifier, processing may proceed at step 312, where the input data is added to the person information on the repository, followed by step 314. If it is determined at step 308 that not all similar data are assigned the same person identifier, processing may proceed at step 310, where existing person information related to the similar data may be merged, followed by step 314. Processing may conclude at step 318.

Figure 4:
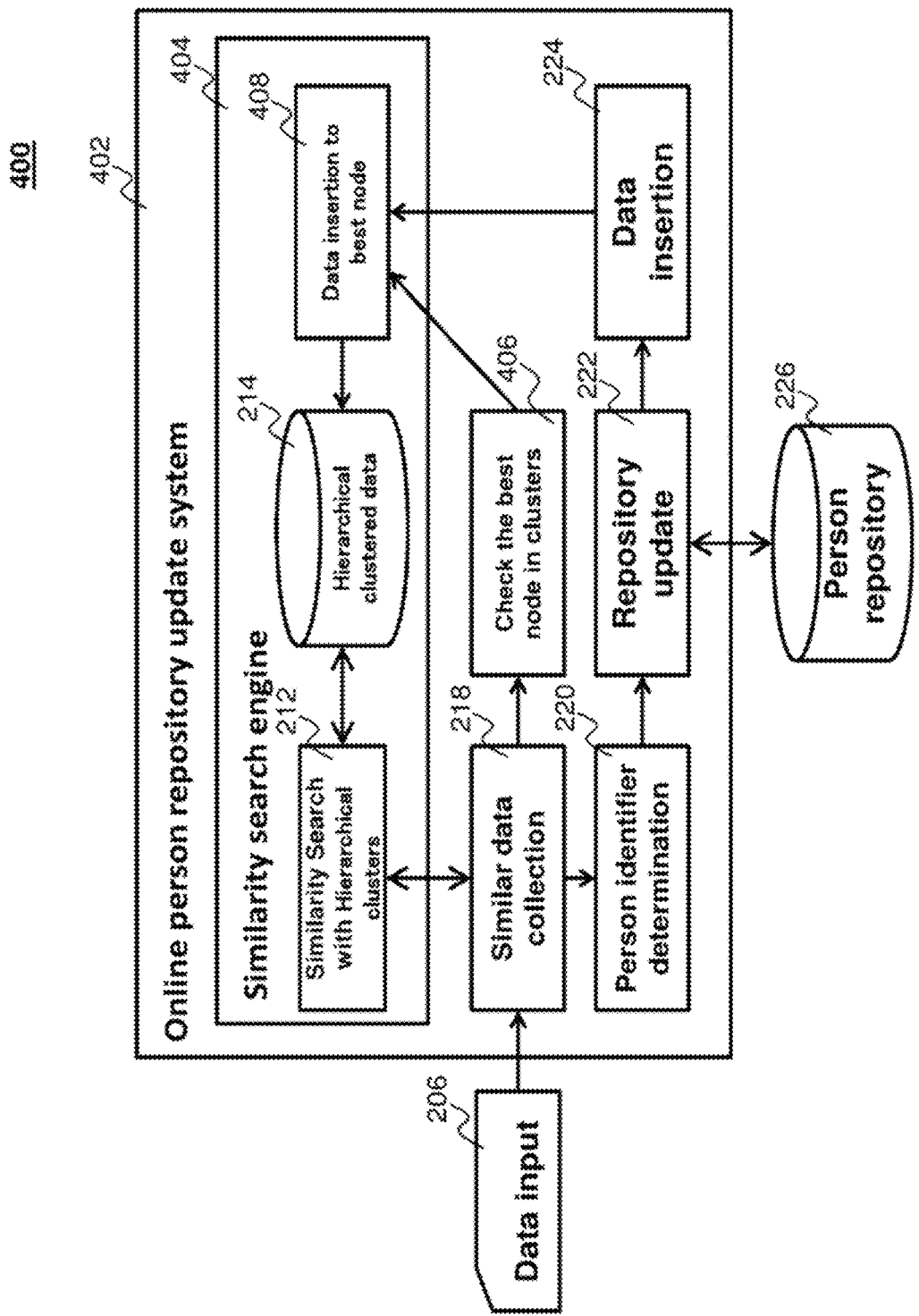
FIG. 4 depicts a further system for grouping same persons in accordance with a present embodiment.

FIG. 4 shows a further system 400 for grouping same persons in accordance with a present embodiment. Various components of the system 400 may be similar or identical to components of the system 200 shown in FIG. 2, so that the same reference signs may be used and duplicate description may be omitted. The similar data collection module 218 of the online person repository update system 402 may output information to a best node checking module 406 for checking the best node in the clusters (like will be described in more detail below). The similarity data collection 218 may searches data that is similar to the inputted data (which may correspond to step corresponds to 304 in FIG. 3). The similar data may be data that has a higher similarity score than the first threshold ("threshold1"). The best node checking module 406 may provide information about the best node to the data insertion module 408 in the similarity search engine 404 inserting the data to the best node. A more detailed description of the "best node" will be provided below with reference to FIG. 10.

Figure 5:
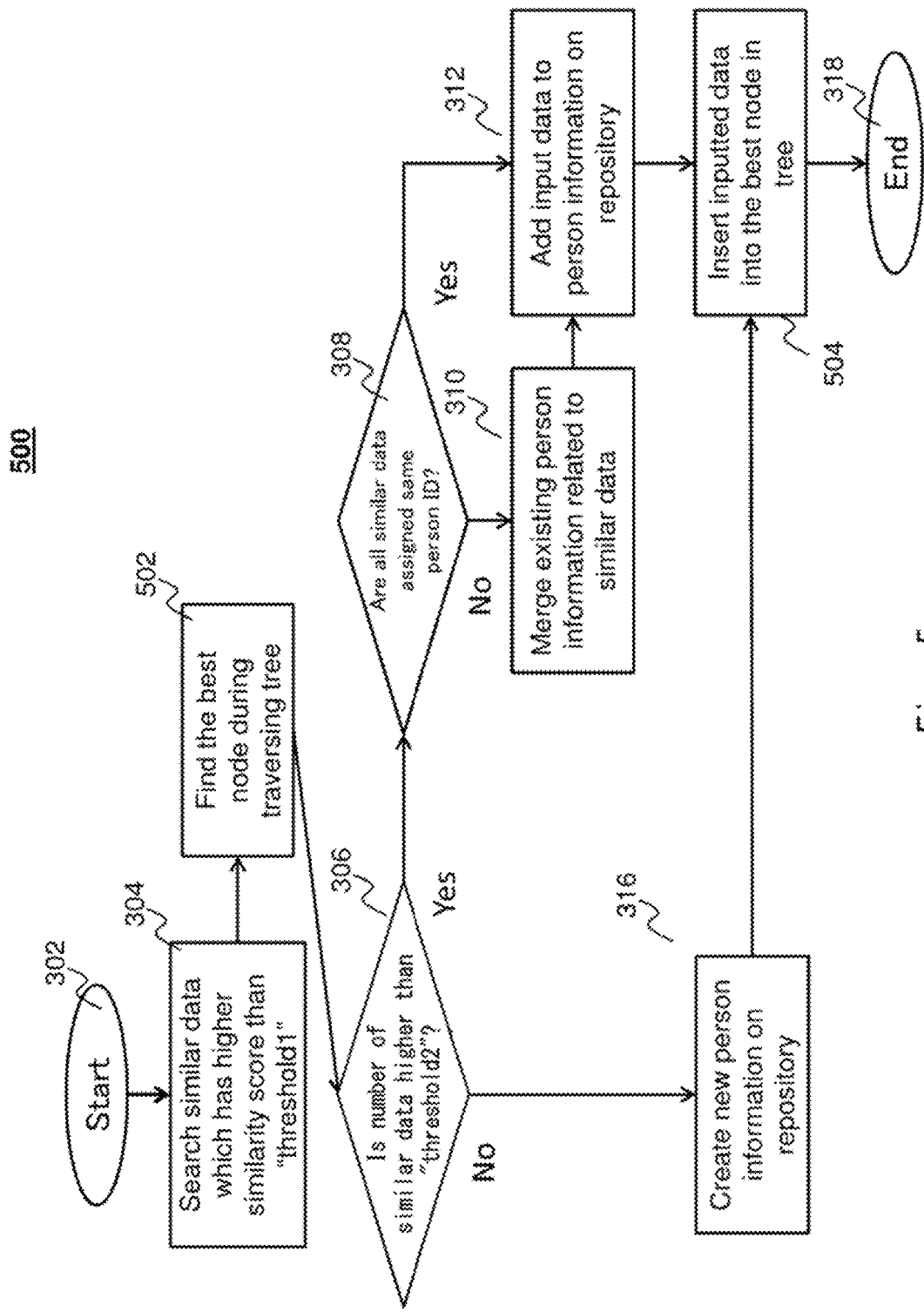
FIG. 5 depicts a flow diagram illustrating a method for online same person grouping with indexing in accordance with the present embodiment.

FIG. 5 shows a flow diagram 500 illustrating a method for online same person grouping with indexing in accordance with the present embodiment, for example using the system 400 of FIG. 4. Various steps of the method illustrated in FIG. 5 may be similar or identical to steps of the method illustrated in FIG. 3, so that the same reference signs may be used and duplicate description may be omitted. At step 502, during traversing the tree when search for similar data, the best node is identified. At step 504, the input data is inserted into the best node in the tree.

Figure 6:
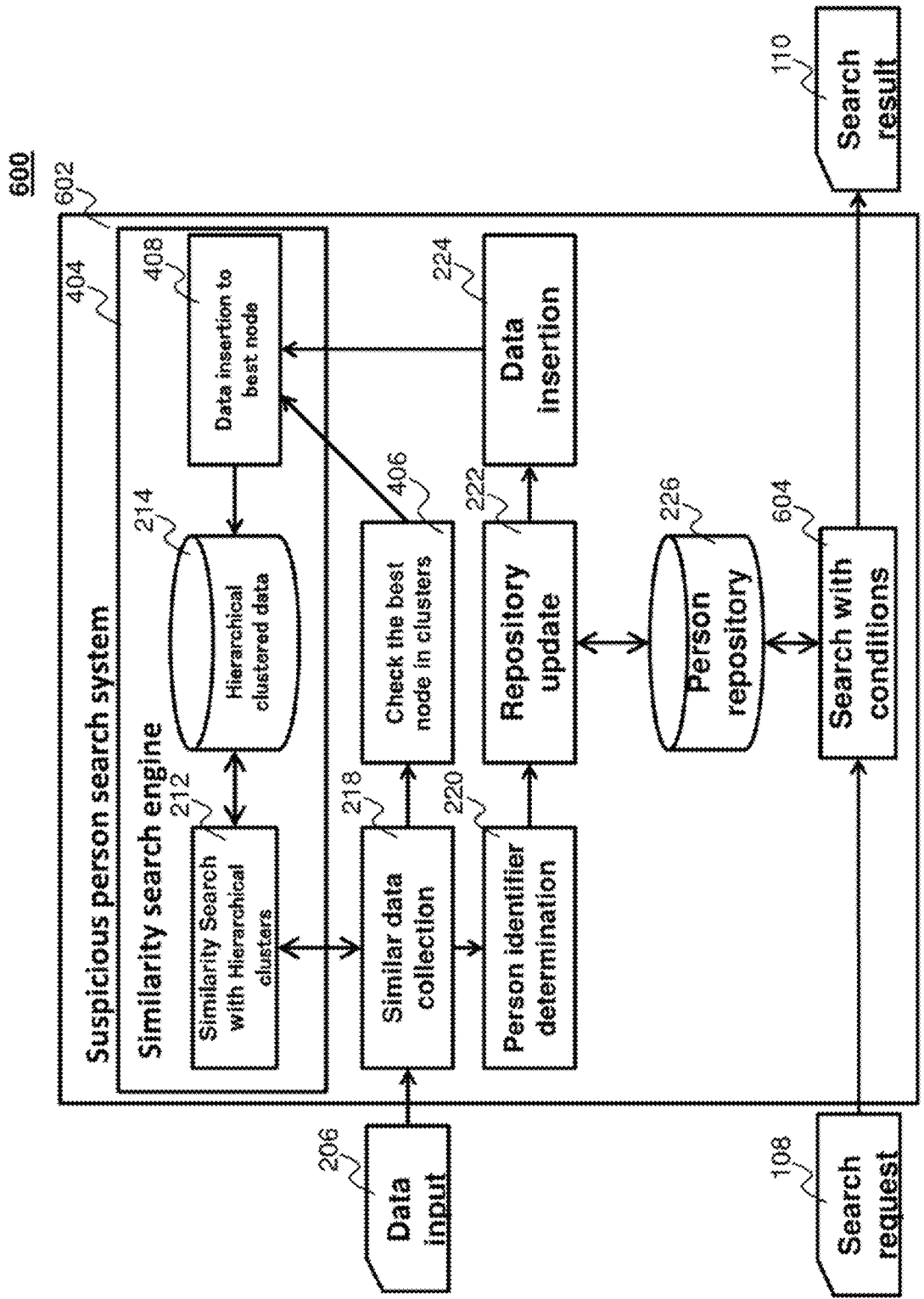
FIG. 6 depicts an illustration of a suspicious person search system 602 in accordance with an embodiment.

FIG. 6 shows an illustration 600 of a suspicious person search system 602 in accordance with an embodiment. The suspicious person search system 602 may include various components which may be similar or identical to components of the system 400 shown in FIG. 4, so that the same reference signs may be used and duplicate description may be omitted. The suspicious person search system 602 may include a module 602 for searching with conditions, which may receive the search request 108 described with reference to FIG. 1 above, and may search for related data in the person repository 208. The module 602 for searching with conditions may return the search result 110 described with reference to FIG. 1 above.

Figure 7:
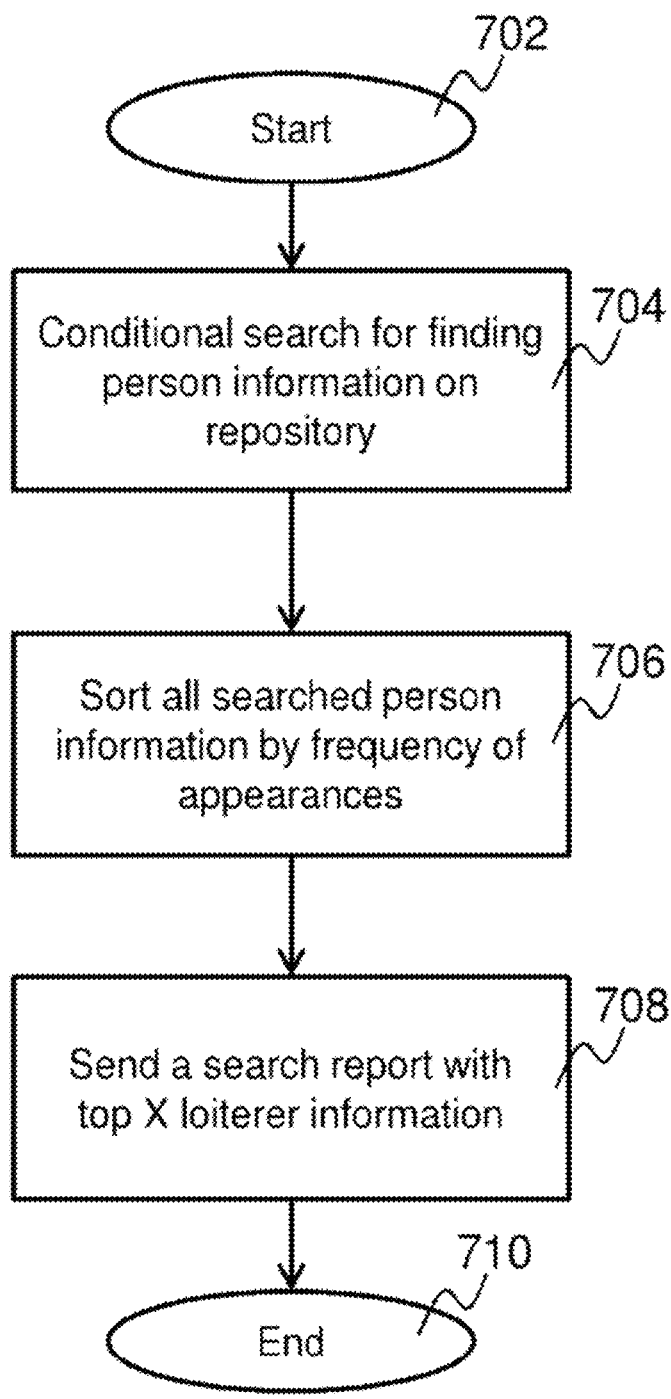
FIG. 7 depicts a flow diagram illustrating a method for on-demand suspicious person search in accordance with the present embodiment.

FIG. 7 shows a flow diagram 700 illustrating a method for on-demand suspicious person search in accordance with the present embodiment, for example using the system 600 of FIG. 6. Processing may start at step 702. At step 704, a conditional search for finding person information on the repository may be carried out. At step 706, all searched person information may be sorted by frequency of appearances. At step 708, a search report with the top X (wherein X is an integer number) loiterer information may be provided (for example sent to the requesting entity). Processing may end at step 710.

In the following, details on the tree structure in the hierarchical database will be described.

Figure 8:
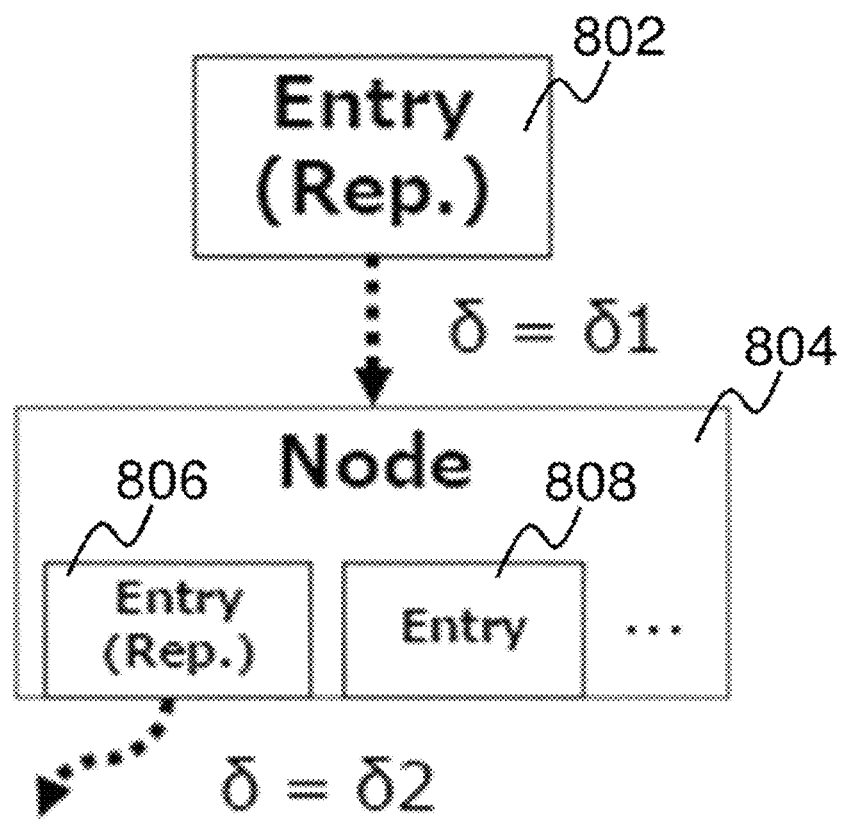
FIG. 8 depicts an illustration of a tree structure according to which data may be stored in the hierarchical database in accordance with an embodiment.

FIG. 8 shows an illustration 800 of a tree structure according to which data may be stored in the hierarchical database in accordance with an embodiment. The database may store hierarchical clustered data based on similarities. A first entry 802 (which may be a base element) may be linked to a first node 804, and threshold $\delta$ (for example a first threshold $\delta_1$) may be associated with the link between the first entry 802 and the first node 804. The first node 804 may include one or more entries, for example a second entry 806 and a third entry 808. In FIG. 8, "Rep." stands for "representative entry". A representative entry has a child node while a leaf entry does not have a child node. Each of the entries in the node 804 (for example each of the second entry 806 and the third entry 808) may or may not be linked to a further node (not shown in FIG. 8). For example, like illustrated in FIG. 8, the second entry 806 may be linked to a further node, and a second threshold ($\delta_2$) may be associated with the link between the second entry 806 and the further node. For example, the third entry 808 may not be linked to any further node.

It is to be noted that the first threshold $\delta_1$ is smaller than the second threshold $\delta_2$:

$$\delta_1 < \delta_2.$$

It will be understood that although only two layers of the tree structure are illustrated in FIG. 8, there may be further layers. For example, the further node, to which the second entry 806 is linked, may include a further plurality of entries, each of which may or may not be linked to yet a further respective node, and the threshold in this link may be larger than the second threshold $\delta_2$. Each entry may be "representative" which has one node with similarity threshold "$\delta$". Furthermore, it will be understood that more than two entries may be included in each node, and that any one of those entries may or may not be linked to a further node. In an embodiment, each node may have entries (which are data) up to an integer number ("maxNumOfEntries") of entries.

Figure 9:
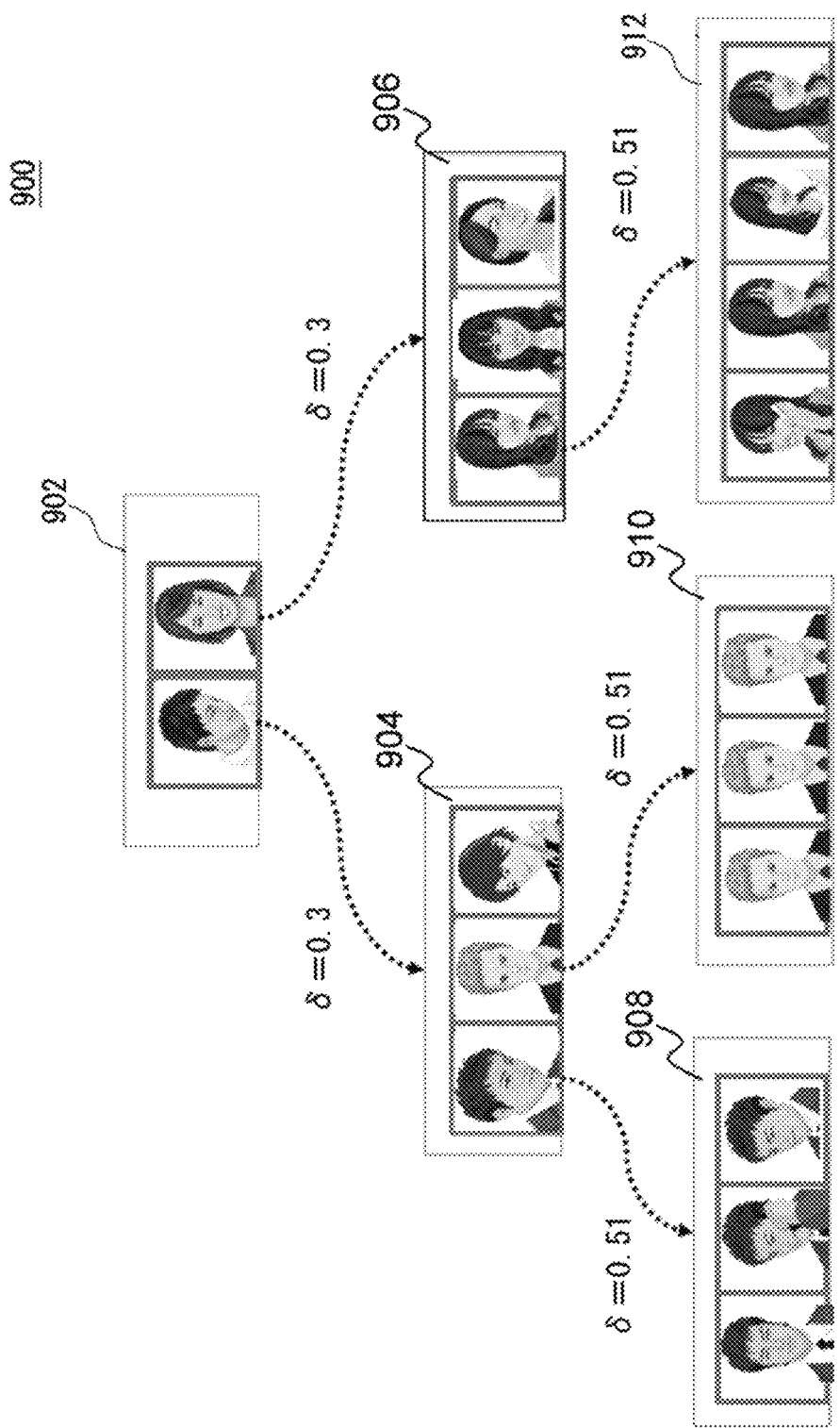
FIG. 9 depicts an exemplary hierarchical structure in accordance with an embodiment.

FIG. 9 shows an exemplary hierarchical structure 900 in accordance with an embodiment. A first layer may include only one node 902 (which may be a base element node 902, and which may also be referred to as root node or top node). The base element node 902 may have a plurality of entries. For illustrative purposes, two entries (a left entry and a right entry) are illustrated. The left entry of base element node 902 may be linked to a second node 904 with a threshold $\delta=0.3$ on a second layer. The right entry of base element node 902 may be linked to a third node 906 with a threshold $\delta=0.3$ on the second layer.

The thresholds from the base element to the various nodes on the second layer may be identical or may be different. The choice of the thresholds depends on what strategy the search engine 210 uses for determining the threshold during the data insertion process. In various embodiments, identical threshold may improve accuracy of approximate similarity search.

The second node 904 may have a plurality of entries. For illustrative purposes, three entries (a left entry, a middle entry, and a right entry) are illustrated. The left entry of the second node 904 may be linked to a fourth node 908 with a threshold $\delta=0.51$ on a third layer. The fourth node 908 may have a plurality of entries. For illustrative purposes, the fourth node 908 is illustrated with three entries. The middle entry of the second node 904 may be linked to a fifth node 910 with a threshold $\delta=0.51$ on the third layer. The fifth node 910 may have a plurality of entries. For illustrative purposes, the fifth node 910 is illustrated with three entries. The right entry of the second node 904 may not be further linked to any subsequent node.

The third node 906 may have a plurality of entries. For illustrative purposes, three entries (a left entry, a middle entry, and a right entry) are illustrated. The left entry of the third node 906 may be linked to a sixth node 912 with a threshold $\delta=0.51$ on the third layer. The sixth node 912 may have a plurality of entries. For illustrative purposes, the sixth node 912 is illustrated with four entries. The middle entry of the third node 906 and the right entry of the third node 906 may not be further linked to any subsequent node.

It will be understood that although none of the entries in the nodes of the third layer is shown to be linked to any subsequent node, each of those entries may be linked to a subsequent node (but does not necessarily have to be linked to a subsequent node).

Figure 10:
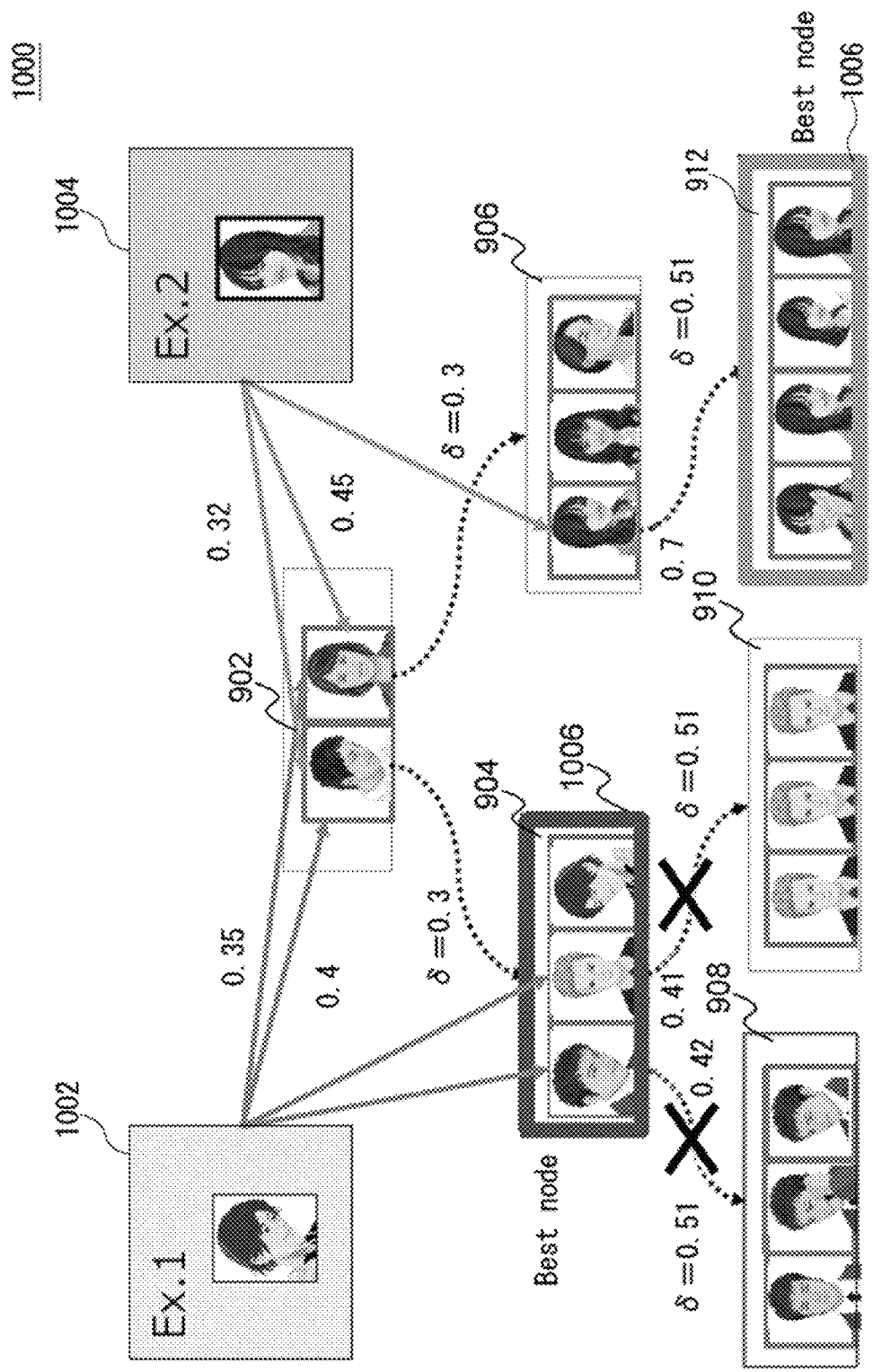
FIG. 10 depicts an illustration of determining the best node in accordance with an embodiment.

FIG. 10 shows an illustration 1000 of determining the best node in accordance with an embodiment. The hierarchical structure illustrated in FIG. 10 is the exemplary hierarchical structure shown in FIG. 9, so that the same reference signs may be used and duplicate description may be omitted. Like will be described below, data (in other words: input data) may be inserted into a "best node" based on similarities. Determining the best node may start from the root node (in other words top node; the base element 902 in the illustration of FIG. 10) as a target node. In a second step, similarities with representative entries may be checked in the target node. If some entries in the target node have a higher similarity (in other words: higher similarity score) with the input data than the threshold $\delta$, processing continues with the child node (in other words: subsequent node) linked with the most similar entry in target node, and processing may continue with the second step (i.e. checking the similarities in the subsequent node as the then target node). If during checking at one node there are no entries in any linked subsequent node which have higher similarity than the threshold $\delta$, the current node is determined as the best node and the data is inserted into current node.

For illustrative purposes, the method for determining the best node will be described with exemplary input data, first input data ("Ex. 1") 1002 and second input data ("Ex. 2") 1004.

The first input data 1002 may have a similarity score of 0.4 with the left entry of the base node 902 and a similarity score of 0.35 with the right entry of the base node 902. Both similarity scores (with the left entry and with the right entry) are higher than the threshold. Since the similarity score is highest with the left entry of the base node 902, processing continues with the node linked as a subsequent node to the left entry of the base node 902, i.e. with the second node 904. In the second node 904, only the left entry and the middle entry are linked to subsequent nodes, so that only for those entries the similarity score is determined. The similarity score between the first input data 1002 and the left entry of the second node 904 may be 0.42. The similarity score between the first input data 1002 and the middle entry of the second node 904 may be 0.41. Both the similarity score between the first input data 1002 and the left entry of the second node 904 and the similarity score between the first input data 1002 and the middle entry of the second node 904 are below the threshold $\delta=0.51$, so that there does not exist any subsequent node with a similarity score higher than the threshold. As such, the second node 904 is determined as the best node 1006 for the first input data 1002.

The second input data 1004 may have a similarity score of 0.32 with the left entry of the base node 902 and a similarity score of 0.45 with the right entry of the base node 902. Both similarity scores (with the left entry and with the right entry) are higher than the threshold. Since the similarity score is highest with the right entry of the base node 902, processing continues with the node linked as a subsequent node to the right entry of the base node 902, i.e. with the third node 906. In the third node 906, only the left entry is linked to subsequent nodes, so that only for the left entry the similarity score is determined. The similarity score between the second input data 1004 and the left entry of the third node 906 may be 0.7, which is higher than the threshold $\delta=0.51$, so that processing may continue with the subsequent node linked to the first entry of the third node 906, i.e. with the sixth node 912. Since none of the entries of the sixth node 906 is linked to a subsequent node, there does not exist any subsequent node with a similarity score higher than the threshold. As such, the sixth node 912 is determined as the best node 1008 for the second input data 1004.

Figure 11:
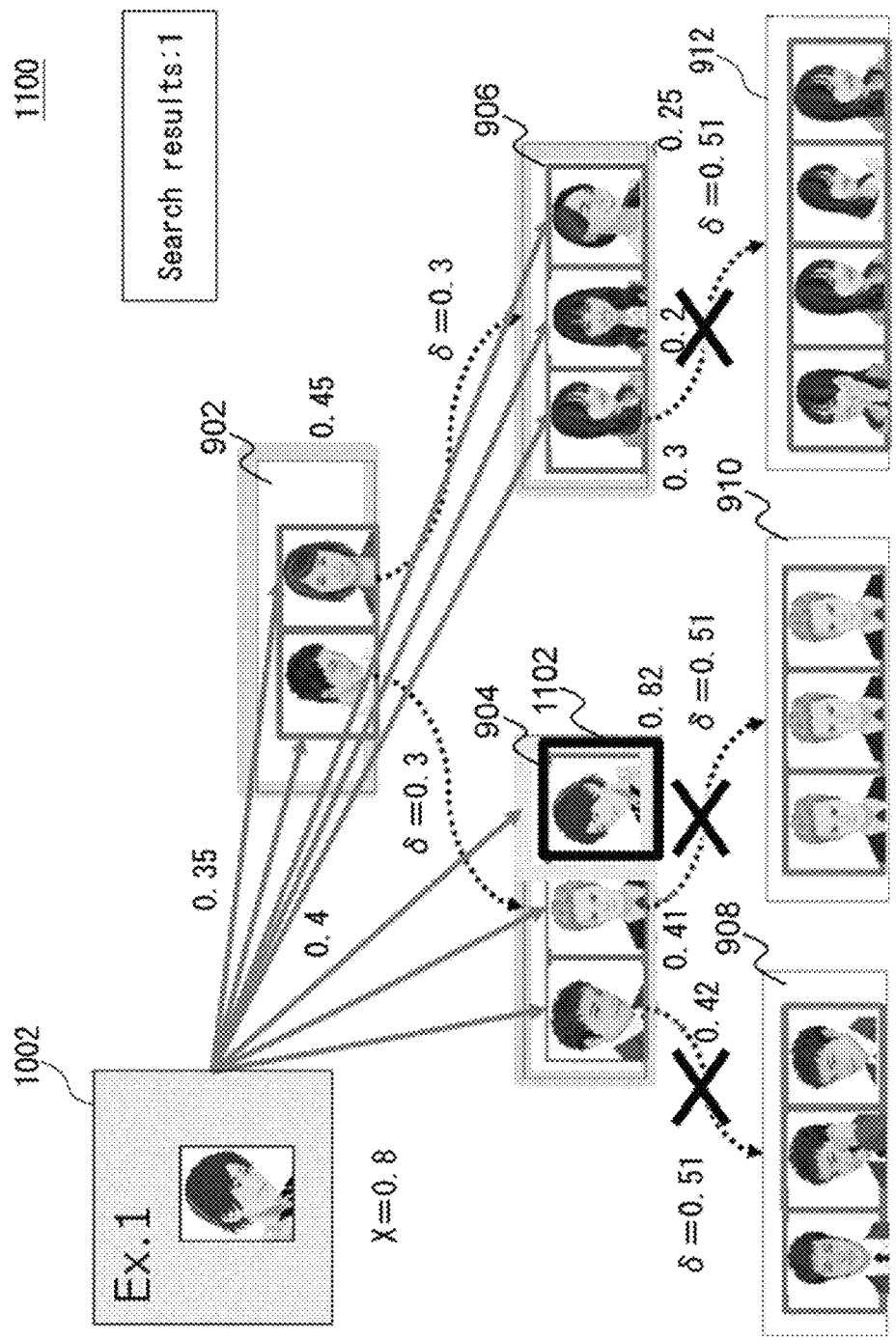
FIG. 11 depicts an illustration of determining a search result in accordance with an embodiment.

FIG. 11 shows an illustration of determining a search result in accordance with an embodiment. The hierarchical structure illustrated in FIG. 11 is the exemplary hierarchical structure shown in FIG. 9, so that the same reference signs may be used and duplicate description may be omitted. For the similarity search of all data which have a similarity score higher than a minimum similarity score ("X"), processing may be carried out as follows: processing may start from the root node (in other words: top node) as a target node. In a second step, similarities with entries in the target node may be checked, and similar entries which have higher similarity score than the minimum similarity score X may be kept. If some representative entries of the target node have a similarity score higher than the threshold $\delta$, the subsequent node (or subsequent nodes) linked to the respective entry or entries of the target node may be added as similar child nodes to a stack. For subsequent processing, a target node may be retrieved from the stack (for example in a pop function), and processing may continue with the second step (i.e. with checking similarities). If the stack does not have any nodes, all similar entries (i.e. all entries with a similarity score higher than the minimum similarity score X) may be output.

It will be understood that compared to determination of the best node, in the similarity search, more than one subsequent node of a target node may be processed. While in the determination of the best node, only the subsequent node (or child node) of the most similar entry of the target node is considered, in the similarity search, all child nodes with a similarity score higher than the threshold δ are considered.

In the similarity search as described above, processing may travel through the best node, but the similarity search result is not necessarily in the best node. For example, if the threshold δ to travel (or fathom) to the subsequent node is lower than the minimum similarity score X, the best node may be in layer which is deeper than the layer in which the similarity search result is found.

For illustrative purposes, the method for similarity search is illustrated with reference to the first input data 1002. The minimum similarity score may be set to X=0.8. The first input data 1002 may have a similarity score of 0.4 with the left entry of the base node 902 and a similarity score of 0.35 with the right entry of the base node 902. Both similarity scores (with the left entry and with the right entry) are higher than the threshold δ, but lower than the minimum similarity score X. As such, none of the entries is added to the list of search results, but both the subsequent node of the left entry of the base node 902 (i.e. the second node 904) and the subsequent node of the right entry of the base node 902 (i.e. the third node 906) are added to the stack. When retrieving the second node 904 from the stack for processing, it may be determined that the similarity score between the first input data 1002 and the left entry of the second node 904 is 0.42, that the similarity score between the first input data 1002 and the middle entry of the second node 904 is 0.41, and that the similarity score between the first input data 1002 and the right entry of the second node 904 is 0.82. Out of the entries of the second node 904, only the right entry has a similarity score higher than the minimum similarity score X=0.8, so that only the right entry of the second node 904 is added to the (still empty) list of similarity search results. Neither the first entry of the second node 904 nor the middle entry of the second node 904 has a similarity higher than the threshold δ=0.51, so that no further child nodes are added to the stack. When retrieving the third node 906 from the stack for processing, it may be determined that the similarity score between the first input data 1002 and the left entry of the third node 906 is 0.3, that the similarity score between the first input data 1002 and the middle entry of the third node 906 is 0.2, and that the similarity score between the first input data 1002 and the right entry of the third node 904 is 0.25. None of the entries of the third node 906 has a similarity score higher than the minimum similarity score X=0.8, so that no further entry is added to the list of similarity search results (which so far only includes the right entry of the second node 904). The first entry of the third node 906, which is the only entry of the third node 906 which has linked to it a child node does not have a similarity higher than the threshold δ=0.51, so that no further child nodes are added to the stack. Since now the stack does not have any more entries for processing, the final list of results may be output: the only similarity search result 1102 is the right entry of the second node 906 with a similarity score of 0.82.

It will be understood that the similarity search may include one or more search results. The similarity search groups the person according to whether they are similar to the person represented by the input data or not, so that advantageously fast online same person grouping may be provided.

Figure 12:
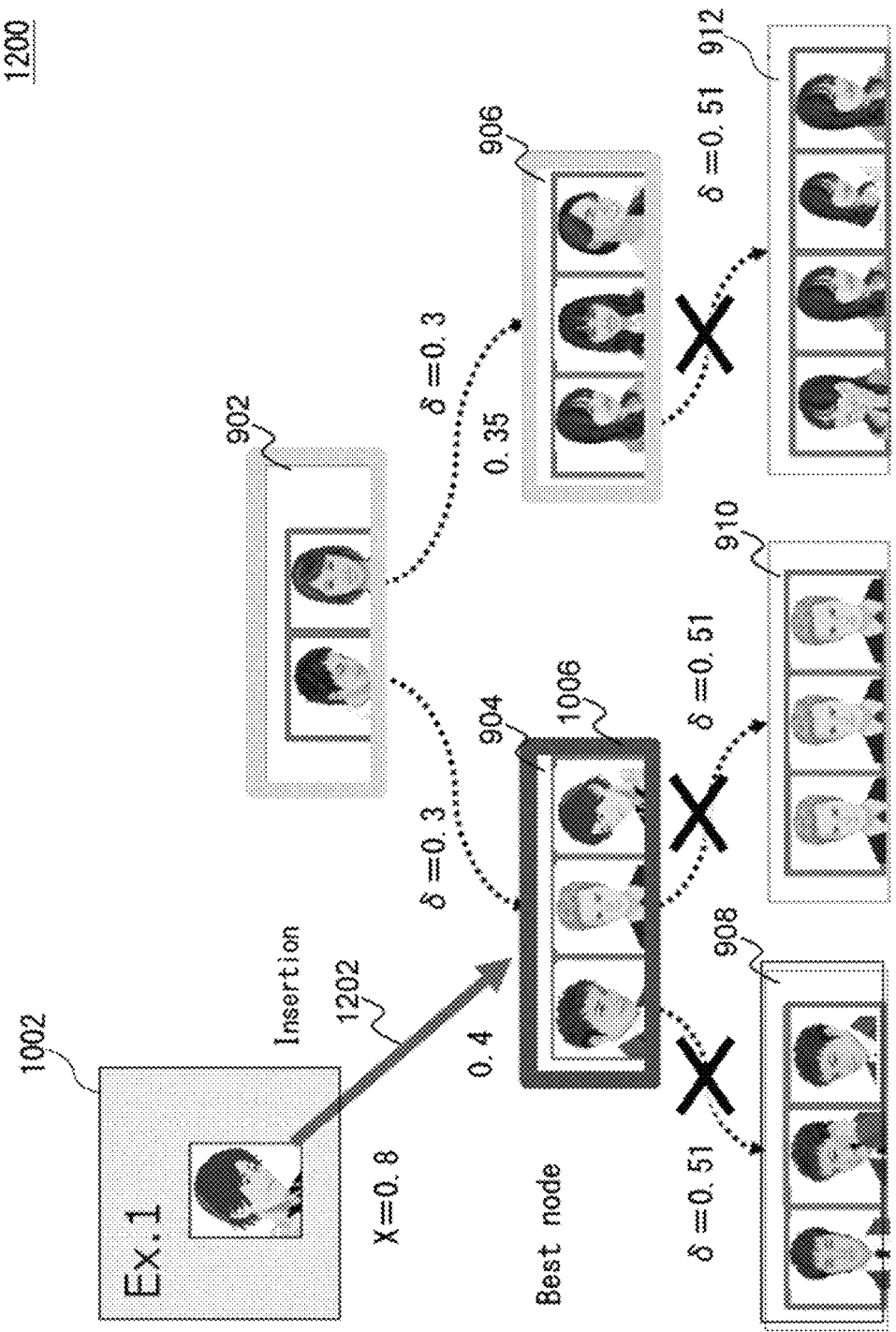
FIG. 12 depicts an illustration of inserting input data into a hierarchical structure in accordance with an embodiment.

FIG. 12 shows an illustration of inserting input data into a hierarchical structure in accordance with an embodiment. The hierarchical structure illustrated in FIG. 12 is the exemplary hierarchical structure shown in FIG. 9, so that the same reference signs may be used and duplicate description may be omitted. As described above, input data may be inserted into the hierarchical structure into the "best node", which may be determined based on the processing carried out by the similarity search. For example, the information of each node and entry passed during the similarity search may be kept. Since the similarity search always passes the best node, the best node for data insertion may be determined after similarity search. In the illustrative example of FIG. 12, the first input data 1002 may be inserted as an additional entry into the best node 1006 (which is the third node 904).

Thus, it can be seen that the present embodiment provides significant enhancements, for example to on-demand suspicious person search systems. In accordance with the present embodiment, systems and methods are provided to allow fast online same person grouping for large number of persons in a database. The system for grouping same persons may include: a database for storing person specific data of a plurality of reference persons in a hierarchical structure; an input module for receiving person specific data of a target person; and a similarity search module for searching the database for data similar to the person specific data of the target person.

The system advantageously may allow security officers to quickly detect suspicious persons who appear frequently and their appearance patterns for a pre-determined number of past days.

Advantageously, online same person grouping with online database indexing for large number of persons may be provided, also providing fast same person search.

Searching may include fathoming (in other words: traversing; in other words: travelling through or travelling down) the hierarchical structure. Advantageously, this provides online same person grouping with online hierarchical clustered data updating.

The hierarchical structure may include a plurality of nodes, each node comprising a plurality of entries, each entry of the plurality of entries being related to one node of the plurality of nodes. This may advantageously allow efficient determination of similarity search results and of a best node for insertion of input data.

Fathoming may include determining a subsequent node (in other words: child node) with a similarity to the present node higher than a pre-determined threshold (which may be referred to as δ). The threshold may be different for each node. For example, the threshold may be different for different layers, but may be identical for all nodes on the respective layer. This may advantageously provide an efficient data structure for similarity search and determination of a best node.

Fathoming may include determining the present node as the best node if no subsequent node with a similarity higher than the pre-determined threshold exists. The system may further include an insertion module for updating the database based on the target person and based on the best node. This may advantageously allow efficient determination of a location in the hierarchical structure for insertion of input data into the hierarchical structure.

The system may further include a repository for storing data related to occurrences of the plurality of persons at least one location. This may advantageously allow for efficient storage of large amounts of data.

The system may further include a suspicious person determination module for determining whether a person is suspicious based on the data stored in the repository. This may advantageously allow determination and prevention of undesirable or illegal behavior of the person.

According to various embodiments, a same person grouping apparatus may include: a database that stores hierarchical clustered facial information-a similar data collection unit that inputs a person feature and outputs similar person features stored in the above database-a density based person identification unit; a person repository updating unit that update a person repository incrementally; and a data insertion unit that inserts an inputted person feature into the above database (at the best node) after updating a person repository. The same person grouping apparatus may include a face recognition apparatus. The same person grouping apparatus may also include a best node checking unit. The same person grouping apparatus may also include a conditional search unit that receives suspicious person search request with specifying certain time range and response information of persons who appear frequently during certain time range. This may advantageously provide an on-demand suspicious person search system by using fast online same person grouping.

While exemplary embodiments have been presented in the foregoing detailed description of the invention, it should be appreciated that a vast number of variations exist. It should further be appreciated that the exemplary embodiments are only examples, and are not intended to limit the scope, applicability, operation, or configuration of the invention in any way. Rather, the foregoing detailed description will provide those skilled in the art with a convenient road map for implementing an exemplary embodiment of the invention, it being understood that various changes may be made in the function and arrangement of steps and method of operation described in the exemplary embodiment without departing from the scope of the invention as set forth in the appended claims.

The program can be stored and provided to the computer device using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (Programmable ROM), EPROM (Erasable PROM), flash ROM, RAM (Random Access Memory), etc.). The program may be provided to the computer device using any type of transitory computer readable media. Examples of transitory computer readable media include electric signals, optical signals, and electromagnetic waves. Transitory computer readable media can provide the program to the computer device via a wired communication line, such as electric wires and optical fibers, or a wireless communication line.

For example, the whole or part of the exemplary embodiments disclosed above can be described as, but not limited to, the following supplementary notes.

(Supplementary Note 1)

A system for grouping same persons, the system comprising:

a database for storing person specific data of a plurality of reference persons in a hierarchical structure;

an input module for receiving person specific data of a target person; and a similarity search module for searching the database for data similar to the person specific data of the target person.

(Supplementary Note 2)

The system in accordance with Supplementary note 1, wherein searching comprises fathoming the hierarchical structure.

(Supplementary Note 3)

The system in accordance with Supplementary note 2, wherein the hierarchical structure comprises a plurality of nodes, each node comprising a plurality of entries, each entry of the plurality of entries being related to one node of the plurality of nodes.

(Supplementary Note 4)

The system in accordance with Supplementary note 3, wherein fathoming comprises determining a subsequent node with a similarity to the present node higher than a pre-determined threshold.

(Supplementary Note 5)

The system in accordance with Supplementary note 4, wherein fathoming comprises determining the present node as the best node if no subsequent node with a similarity higher than the pre-determined threshold exists.

(Supplementary Note 6)

The system in accordance with Supplementary note 5, further comprising:

an insertion module for updating the database based on the target person and based on the best node.

(Supplementary Note 7)

The system in according with any one of Supplementary notes 1 to 6, further comprising:

a repository for storing data related to occurrences of the plurality of persons at least one location.

(Supplementary Note 8)

The system in accordance with Supplementary note 7, further comprising:

a suspicious person determination module for determining whether a person is suspicious based on the data stored in the repository.

(Supplementary Note 9)

The system in accordance with Supplementary note 7 or 8, further comprising:

a repository update module for updating the data related to occurrences of the plurality of persons at least one location based on the received person specific data.

(Supplementary Note 10)

The system in accordance with any one of Supplementary notes 1 to 9, wherein person specific data comprises at least one of image data, information related to a feature of a face of the respective person, information related to a shape of head of the respective person, information related to a position of the eyes of the respective person, information related to a position of the nose of the respective person, information related to a position of the mouth of the respective person, audio data, voice data, information related to a body shape of the respective person, or information on cloths that the respective person is wearing.

(Supplementary Note 11)

The system in accordance with any one of Supplementary notes 1 to 10, further comprising:

a person identifier determination module for traversing the hierarchical structure of the database based on the received person specific data.

(Supplementary Note 12)

A method for grouping same persons, the method comprising:

storing in a database person specific data of a plurality of reference persons in a hierarchical structure;

receiving person specific data of a target person; and searching the database for data similar to the person specific data of the target person.

(Supplementary Note 13)

The method in accordance with Supplementary note 12, wherein searching comprises fathoming the hierarchical structure.

(Supplementary Note 14)

The method in accordance with Supplementary note 13, wherein the hierarchical structure comprises a plurality of nodes, each node comprising a plurality of entries, each entry of the plurality of entries being related to one node of the plurality of nodes.

(Supplementary Note 15)

The method in accordance with Supplementary note 14, wherein fathoming comprises determining a subsequent node with a similarity to the present node higher than a pre-determined threshold.

(Supplementary Note 16)

The method in accordance with Supplementary note 15, wherein fathoming comprises determining the present node as the best node if no subsequent node with a similarity higher than the pre-determined threshold exists.

(Supplementary Note 17)

The method in accordance with Supplementary note 16, further comprising:

updating the database based on the target person and based on the best node.

(Supplementary Note 18)

The method in according with any one of Supplementary notes 12 to 17, further comprising:

storing in a repository data related to occurrences of the plurality of persons at least one location.

(Supplementary Note 19)

The method in accordance with Supplementary note 16, further comprising:

determining whether a person is suspicious based on the data stored in the repository.

(Supplementary Note 20)

The method in accordance with Supplementary note 18 or 19, further comprising:

updating the data related to occurrences of the plurality of persons at least one location based on the received person specific data.

(Supplementary Note 21)

The method in accordance with any one of Supplementary notes 12 to 20, wherein person specific data comprises at least one of image data, information related to a feature of a face of the respective person, information related to a shape of head of the respective person, information related to a position of the eyes of the respective person, information related to a position of the nose of the respective person, information related to a position of the mouth of the respective person, audio data, voice data, information related to a body shape of the respective person, or information on cloths that the respective person is wearing.

(Supplementary Note 22)

The method in accordance with any one of Supplementary notes 12 to 21, further comprising:

traversing the hierarchical structure of the database based on the received person specific data.

(Supplementary Note 23)

A non-transitory computer readable medium containing program instructions for causing a computer to perform a method for grouping same persons comprising:

storing person specific data of a plurality of reference persons in a hierarchical structure;

receiving person specific data of a target person; and searching the database for data similar to the person specific data of the target person.

This application is based upon and claims the benefit of priority from Singapore provisional patent application No. 10201807508Y, filed on Aug. 31, 2018, the disclosure of which is incorporated herein in its entirety by reference.

REFERENCE SIGNS LIST 102 surveillance system
104 data base
106 authorized entity
108 search request
110 search result
200, 400 system
204 online person repository update system
206 data input module
208 person repository
210, 404 similarity search engine
212 similarity search module
214 hierarchical clustered database
216 hierarchical cluster update module
218 similar data collection module
220 person identifier (ID) determination module
222 repository update module
224 data insertion module
226 person repository
406 best node checking module
408 data insertion module
602 suspicious person search system
604 search with conditions module
802 first entry
804 first node
806 second entry
808 third entry

What is claimed is:

1. A system for grouping same persons, the system comprising:

a database for storing person specific data of a plurality of reference persons in a hierarchical structure;

one or more memories configured to store one or more instructions; and one or more processors configured to execute the one or more instructions to, receive person specific data of a target person;

search the database for data similar to the person specific data of the target person; and output a result of the similarity search, wherein the searching comprises traversing the hierarchical structure, wherein, the hierarchical structure comprises a plurality of nodes, each node comprising a plurality of entries, each entry of the plurality of entries being related to one node of the plurality of nodes, and wherein the traversing the hierarchical structure comprises:
- determining a subsequent node with a similarity to the present node higher than a pre-determined threshold, and
- determining the present node as the best node if no subsequent node with a similarity higher than the pre-determined threshold exists.

2. The system in accordance with claim 1,
wherein the one or more processors is configured to update the database based on the target person and based on the best node.

3. The system in according with claim 1,
wherein the one or more processors is configured to store data related to occurrences of the plurality of persons at least one location.

4. The system in accordance with claim 3,
wherein the one or more processors is configured to update determine whether a person is suspicious based on the data stored in the repository.

5. The system in accordance with claim 3,
wherein the one or more processors is configured to update the data related to occurrences of the plurality of persons at least one location based on the received person specific data.

6. The system in accordance with claim 1,
wherein person specific data comprises at least one of image data, information related to a feature of a face of the respective person, information related to a shape of head of the respective person, information related to a position of the eyes of the respective person, information related to a position of the nose of the respective person, information related to a position of the mouth of the respective person, audio data, voice data, information related to a body shape of the respective person, or information on cloths that the respective person is wearing.

7. The system in accordance with claim 1, further comprising:
wherein the one or more processors is configured to traverse the hierarchical structure of the database based on the received person specific data.

8. A method for grouping same persons, the method comprising:
storing in a database person specific data of a plurality of reference persons in a hierarchical structure;
receiving person specific data of a target person; and
searching the database for data similar to the person specific data of the target person,
wherein the searching comprises traversing the hierarchical structure,
wherein the hierarchical structure comprises a plurality of nodes, each node comprising a plurality of entries, each entry of the plurality of entries being related to one node of the plurality of nodes,
wherein the traversing the hierarchical structure comprises:
- determining a subsequent node with a similarity to the present node higher than a pre-determined threshold, and
- determining the present node as the best node if no subsequent node with a similarity higher than the pre-determined threshold exists.

9. The method in accordance with claim 8, further comprising:
updating the database based on the target person and based on the best node.

10. The method in according with claim 8, further comprising:
storing in a repository data related to occurrences of the plurality of persons at least one location.

11. The method in accordance with claim 10, further comprising:
determining whether a person is suspicious based on the data stored in the repository.

12. A non-transitory computer readable medium containing program instructions for causing a computer to perform a method for grouping same persons comprising:
storing person specific data of a plurality of reference persons in a hierarchical structure;
receiving person specific data of a target person; and
searching the database for data similar to the person specific data of the target person,
wherein the searching comprises traversing the hierarchical structure,
wherein the hierarchical structure comprises a plurality of nodes, each node comprising a plurality of entries, each entry of the plurality of entries being related to one node of the plurality of nodes,
wherein the traversing the hierarchical structure comprises:
- determining a subsequent node with a similarity to the present node higher than a pre-determined threshold, and
- determining the present node as the best node it no subsequent node with a similarity higher than the pre-determined threshold exists.

* * * * *